United States Patent [19]
Shih et al.

[11] Patent Number: 5,589,126
[45] Date of Patent: Dec. 31, 1996

[54] PLASTICIZED POLYESTER FOR SHRINK FILM APPLICATIONS

[75] Inventors: Wayne K. Shih; Ronald R. Light, both of Kingsport, Tenn.

[73] Assignee: Eastman Chemical Company, Kingsport, Tenn.

[21] Appl. No.: 608,021

[22] Filed: Mar. 4, 1996

Related U.S. Application Data

[62] Division of Ser. No. 410,594, Mar. 24, 1995, Pat. No. 5,534,570, which is a continuation of Ser. No. 157,546, Nov. 26, 1993, abandoned.

[51] Int. Cl.$^6$ ........................................ D01F 1/02
[52] U.S. Cl. .................. 264/211; 264/230; 264/349; 524/114
[58] Field of Search .................. 264/211, 230, 264/349; 524/114, 127, 310, 318, 605

[56] References Cited

U.S. PATENT DOCUMENTS

| | | | |
|---|---|---|---|
| 4,059,667 | 11/1977 | Pangonis | 264/289 |
| 4,963,418 | 10/1990 | Isaka et al. | 428/349 |
| 4,996,291 | 2/1991 | Yoshinaka et al. | 528/272 |

*Primary Examiner*—Paul R. Michl
*Assistant Examiner*—U. K. Rajguru
*Attorney, Agent, or Firm*—Harry J. Gwinnell; John D. Thallemer

[57] ABSTRACT

This invention relates to polyester/plasticizer blends which are useful as heat-shrinkable films or sheet in low temperature shrink packaging applications. The plasticizer is injected into the melt of the polyester. The plasticizer lowers the glass transition temperature, on-set temperature and shrink rate of the polyester. Film or sheet produced by the polyester/plasticizer blends is clear.

2 Claims, No Drawings

PLASTICIZED POLYESTER FOR SHRINK FILM APPLICATIONS

This is a divisional application of application Ser. No. 08/410,594, filed Mar. 24, 1995, now U.S. Pat. No. 5,534, 570, which is a file wrapper continuation of application Ser. No. 08/157,546, filed Nov. 26, 1993, now abandoned.

FIELD OF THE INVENTION

This invention relates to polyester/plasticizer blends which are useful as heat-shrinkable films or sheet in low temperature shrink packaging applications. The plasticizer is injected into the melt of the polyester. The plasticizer lowers the glass transition temperature, on-set temperature and shrink rate of the polyester. Film or sheet produced by the polyester/plasticizer blends is clear.

BACKGROUND OF THE INVENTION

Heat-shrinkable plastic films are used for labelling, protection, parceling, and wrapping of glass, metal, ceramic and plastic bottles, boxes, cans, pipes, and wood. For example, neat-shrinkable films are widely used as tamper evident labels on food and pharmaceutical products and as primary labels on plastic containers such as soft drink bottles. Shrink films are classified into two categories: (1) biaxially oriented film for wrapping wherein the film shrinks in both the x- and y-axis directions, and (2) uniaxially oriented film wherein the film primarily shrinks in the stretched or oriented direction and has a little shrinkage in the unstretched or nonoriented direction.

The most widely used shrink film is polyvinylchloride (PVC), however, shrink films have been prepared from polystyrene (OPS), oriented polyethylene, oriented polypropylene, and polyesters. While PVC has good heat-shrinkable properties, PVC is not suitable for low temperature shrink packaging. In addition, the incineration of PVC generates hydrogen chloride which causes corrosion of the incinerator and environmental pollution.

Example of a heat-shrinkable polyester film are disclosed in U.S. Pat. Nos. 4,996,291 and 4,963,418. U.S. Pat. No. 4,996,291 discloses a heat-shrinkable polyester film prepared from polyethylene terephthalate. While a list of additives is included, plasticizers are not listed. U.S. Pat. No. 4,963,418 discloses a heat-shrinkable polyester film prepared from a polyester, a polyester copolymer, or a mixture of a polyester and a polyester copolymer. No suggestion is made of forming a blend with a plasticizer or any other additive.

Previously disclosed polyester films have at least two major disadvantages, a higher on-set shrink temperature than 50°–60° C. and a higher shrink rate than 4% per degree celsius. A high on-set shrink temperature means that the film or sheet requires a higher temperature at which the film starts to contract in a heated shrink tunnel or oven. High on-set temperature can cause container or content damage. The other disadvantage is a higher shrink rate which refers to the percent shrinkage per degree of temperature increase. A high shrink rate causes wrinkle or bubble formation in shrink film or sheet as it travels through the shrink tunnel.

The present inventors have unexpectedly determined that the on-set shrink temperature and the shrink rate of a heat-shrinkable film or sheet prepared from a polyester can be decreased by melt blending a critical amount of a plasticizer selected from a $C_4$ to $C_{20}$ alkyl ester of an epoxidized fatty acid having 12 to 20 carbon atoms provided the plasticizer has sufficient stability to permit its incorporation into the polyester at a temperature of 200° C. to 300° C. Moreover, the polyester/plasticizer blends of the present invention produce clear film without the environmental disadvantages associated with other films.

SUMMARY OF THE INVENTION

Accordingly, it is one object of the present invention to provide a heat-shrinkable film which is environmentally safe and does not contain the disadvantages associated with previous heat shrinkable films.

Accordingly, it is another object of the invention is to provide heat shrinkable films with lower on-set temperature and lower shrink rate than heat-shrinkable films prepared from polyvinylchloride.

Accordingly, it is a further object of the invention to provide a process for preparing heat shrinkable films wherein the on-set temperature can be modified to meet individual specifications.

Still another object of the invention is to provide heat-shrinkable films which exhibit resistance to heat, printability, impact resistance, and stress crack resistance, and which display excellent melt flowability at the time of extrusion thereof.

These and other objects are accomplished herein by a heat-shrinkable film comprising a blend of:

(A) 90 to 99 weight percent of a polyester having a glass transition temperature of 40° C. to 150° C. and an inherent viscosity of 0.5 to 1.2 dL/g, comprising
  (1) a dicarboxylic acid component comprising repeat units from at least 80 mole percent of an aromatic dicarboxylic acid having 8 to 14 carbon atoms, and
  (2) a diol component comprising repeat units from at least 10 mole percent of 1,4-cyclohexanedimethanol, based on 100 mole percent dicarboxylic acid and 100 mole percent diol; and (B) 1 to 10 weight percent of a plasticizer selected from a $C_4$ to $C_{20}$ alkyl ester of an epoxidized fatty acid having 12 to 20 carbon atoms provided the plasticizer has sufficient stability to permit its incorporation into the polyester at a temperature of 200° C. to 300° C., wherein the combined weights of (A) and (B) total 100 percent.

DESCRIPTION OF THE INVENTION

The polyester, component (A), of the present invention includes copolyesters. The polyester may be semi-crystalline or amorphous, preferably amorphous. The polyester contains repeat units from a dicarboxylic acid and a diol, based on 100 mole percent dicarboxylic acid and 100 mole percent diol. The dicarboxylic acid component contains at least 80 mole percent of an aromatic dicarboxylic acid having 8 to 14 carbon atoms. The polyester may optionally be modified with up to 20 mole percent, based on 100 mole percent dicarboxylic acid, of one or more different dicarboxylic acids other than an aromatic dicarboxylic acid, such as saturated aliphatic dicarboxylic acids having 4 to 12 carbon atoms and cycloaliphatic dicarboxylic acids having 8 to 12 carbon atoms. Specific examples of dicarboxylic acids are: terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. The polyester may be prepared from one or more of the above dicarboxylic acids.

It should be understood that use of the corresponding acid anhydrides, esters, and acid chlorides of these acids is included in the term "dicarboxylic acid".

The diol component contains repeat units from at least 10 mole percent 1,4-cyclohexanedimethanol. In addition, the diol component can optionally be modified with up to 90 mole percent, based on 100 mole percent diol, of one or more different diols other than 1,4-cyclohexanedimethanol. Such additional diols include cycloaliphatic diols having 6 to 15 carbon atoms and aliphatic diols having 3 to 8 carbon atoms. Examples of such diols to be included with 1,4-cyclohexanedimethanol are: ethylene glycol, diethylene glycol, triethylene glycol, propane-1,3-diol, butane-1,4-diol, 2,2-dimethylpropane-1,3-diol (neopentyl glycol), pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, and the like. The polyester may be prepared from one or more of the above diols.

The polyester may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

For the purposes of the present invention, the preferred polyester, component (A), has a dicarboxylic acid component consisting of repeat units from terephthalic acid and a diol component consisting of repeat units from 65 to 90 mole percent ethylene glycol and 35 to 10 mole percent 1,4-cyclohexanedimethanol. More preferably, the diol portion consists of 67 to 75 mole percent ethylene glycol and 33 to 25 mole percent 1,4-cyclohexanedimethanol.

Polyesters useful as component (A) have an inherent viscosity of 0.5 to 1.2 dL/g. Preferably, the polyester has an inherent viscosity of 0.6 to 0.9 dL/g as measured at 25° C. using 0.50 grams of polymer per 100 ml of a solvent consisting of 60% by weight phenol and 40% by weight tetrachloroethane. Polyesters useful as component (A) also have a glass transition temperature of 40° C. to 150° C., preferably 50° C. to 100° C.

The polyester may be prepared by conventional polycondensation procedures well-known in the art. Such processes include direct condensation of the dicarboxylic acid(s) with the diol(s) or by ester interchange using a dialkyl dicarboxylate. For example, a dialkyl terephthalate such as dimethyl terephthalate is ester interchanged with the diol(s) at elevated temperatures in the presence of a catalyst. The polyesters may also be subjected to solid state polymerization methods.

Component (B) of the present invention is a plasticizer. Plasticizers useful as component (B) are elected from a $C_4$ to $C_{20}$ alkyl ester of an epoxidized fatty acid having 12 to 20 carbon atoms. The plasticizer should have sufficient stability to permit its incorporation into the polyester at a temperature of 200° C. to 300° C., preferably, 250° C. to 280° C. The term "sufficient stability" means that the plasticizer should be stable to decomposition and volatility within a temperature range of 200° C. to 300° C. Examples of suitable plasticizers include: octyl epoxy soyate, epoxidized soybean oil, epoxy tallates, epoxidized inseed oil, triphenyl phosphate, neopentyl glycol dibenzoate, glycerine, vegetable oil, caster oil, and mineral oil. Preferably, the plasticizer is octyl epoxy soyate which is commercially available under the tradename VIKOFLEX 7080 from Elf Atochem.

The process for preparing the polyester/plasticizer blends of the present invention involve preparing the polyester by a process as mentioned previously. The polyester is dried in an atmosphere of dried air or dried nitrogen, or under reduced pressure. Under melt processing conditions the polyester undergoes molecular weight degradation in the presence of contaminants such as water, thus, it is preferable that the polyester be incorporated in anhydrous form into the blends of the present invention.

The plasticizer is mixed with the polyester by any suitable melt blending process such as batch mixing, single screw, or twin screw extrusion. Preferably, the plasticizer is injected into the melt of the polyester using a liquid or solid pumping system. The polyester/plasticizer blends may also be prepared by adding the plasticizer to the polyester late in the polymerization after polymerization is essentially complete. After completion of the melt compounding, the extrudate is withdrawn in strand form, and recovered according to the usual way such as cutting.

The extrudate, prepared above, may be used as a concentrate which is mixed with the polyester, component (A). Methods for mixing the concentrate pellets with the polyester pellets include feeding the concentrate pellets with an additive feeder and mechanically mixing the polyester and concentrate pellets. The polyester/concentrate blends are melt blended, dried and extruded into a film or sheet.

The percentage by weight of the polyester in the polyester/plasticizer blend is 90 to 99%. More preferably, the polyester constitutes 94 to 98 weight percent of the polyester/plasticizer blend. The polyester/plasticizer blends of the present invention have an inherent viscosity of 0.55 dl/g to 1.5 dl/g, preferably 0.70 to 0.80 dl/g as measured at 23° C. using 0.50 grams of polymer per 100 ml of a solvent consisting of 60% by weight phenol and 40% by weight tetrachloroethane.

Many other ingredients can be added to the compositions of the present invention to enhance the performance properties of the blends. For example, denesting agents, antiblocking agents, stabilizers, antioxidants, ultraviolet light absorbing agents, mold release agents, metal deactivators, colorants such as titanium dioxide and carbon black, granulated silica, kaolin, calcium carbonate, anti-static agents, fillers, and the like, can be included herein. All of these additives and the use thereof are well known in the art and do not require extensive discussions. Therefore, only a limited number will be referred to, it being understood that any of these compounds can be used so long as they do not hinder the present invention from accomplishing its objects.

The polyester/plasticizer blends of the present invention serve as-excellent starting materials for the production of films of all types especially heat-shrinkable films and sheet. Heat-shrinkable plastic films are used for labelling, protection, parceling, and wrapping of glass, metal, ceramic and plastic bottles, boxes, cans, pipes, and wood. For example, heat-shrinkable films are widely used as tamper evident labels on food and pharmaceutical products, as primary labels on plastic containers such as soft drink bottles, and protective wraps for medicines and dry cell batteries.

The materials and testing procedures used for the results shown herein are as follows:

Haze was determined by ASTM D1003. Haze values of less than 5% are acceptable for clear sheet or film.

Maximum shrink rate is defined as the maximum first derivative or slope of the shrink curve and indicates how fast the film will contract when it is heated in an oven or tunnel.

On-set shrink temperature is the temperature at which the film shrinks 2%.

The invention will be further illustrated by a consideration of the following examples, which are intended to be exemplary of the invention. All parts and percentages in the examples are on a weight basis unless otherwise stated.

EXAMPLE I

Polyester pellets consisting of 100 mole percent terephthalic acid, 65–70 mole percent ethylene glycol and 30–35 mole percent 1,4-cyclohexanedimethanol with an I.V. of 0.75 was dried at 65° C. for 4 hours in desiccant air with a dew point ≦–29° C. The PETG polyester was placed in the hopper of a single screw extruder and extruded into 5–10 ml sheets at 260° C.

The polyester had an I.V. of 0.73 dl/g and a Tg, as determined by DSC at 20° C./min, of 77° C. The test results of the PETG polyester are summarized in Table I.

EXAMPLE II

Sheet prepared from 98 wt % PETG polyester and 2 wt % octyl epoxy soyate.

A polyester/plasticizer concentrate was prepared using 10 weight percent of liquid octyl epoxy soyate and 90 weight percent of the PETG polyester pellets prepared in Example I. The concentrate pellets were mechanically blended with PETG polyester pellets from Example I in a ratio of 20/80, respectively. The pellets were extruded into a sheet using a single screw extruder.

The final concentration of octyl epoxy soyate in the sheet was 2 weight percent. The polymer had a Tg, as determined by DSC at 20° C./min, of 67° C. The test results are summarized in Table I.

EXAMPLE III

Sheet prepared from 96 wt % PETG copolyester and 4 wt % octyl epoxy soyate.

A polyester/plasticizer concentrate was prepared using 10 weight percent of liquid octyl epoxy soyate and 90 weight percent of the PETG polyester pellets prepared in Example I. The concentrate pellets were mechanically blended with PETG polyester pellets from Example I in a ratio of 40/60, respectively. The pellets were extruded into a sheet using a single screw extruder.

The final concentration of octyl epoxy soyate in the sheet was 4 weight percent. The polymer had a Tg, as determined by DSC at 20° C./min, of 61° C. The test results are summarized in Table I.

EXAMPLE IV

Sheet prepared from 94 wt % PETG copolyester and 6 wt % octyl epoxy soyate.

A polyester/plasticizer concentrate was prepared using 10 weight percent of liquid octyl epoxy soyate and 90 weight percent of the PETG polyester pellets prepared in Example I. The concentrate pellets were mechanically blended with PETG polyester pellets from Example I in a ratio of 60/40, respectively. The pellets were extruded into a sheet using a single screw extruder.

The final concentration of octyl epoxy soyate in the sheet was 6 weight percent. The polymer had a Tg, as determined by DSC at 20° C./min, of 54° C. The test results are summarized in Table I.

EXAMPLE V

Sheet prepared from 92 wt % PETG copolyester and 8 wt % octyl epoxy soyate.

A polyester/plasticizer concentrate was prepared using 10 weight percent of liquid octyl epoxy soyate and 90 weight percent of the PETG polyester pellets prepared in Example I. The concentrate pellets were mechanically blended with PETG polyester pellets from Example I in a ratio of 80/20, respectively. The pellets were extruded into a sheet using a single screw extruder.

The final concentration of octyl epoxy soyate in the sheet was 8 weight percent. The polymer had a Tg, as determined by DSC at 20° C./min, of 49° C. The test results are summarized in Table I.

EXAMPLE VI

Sheet prepared from 90 wt % PETG copolyester and 10 wt % octyl epoxy soyate.

A polyester/plasticizer concentrate was prepared using 10 weight percent of liquid octyl epoxy soyate and 90 weight percent of the PETG polyester pellets prepared in Example I. The concentrate pellets were mechanically blended with PETG polyester pellets from Example I in a ratio of 90/10, respectively. The pellets were extruded into a sheet using a single screw extruder.

The final concentration of octyl epoxy soyate in the sheet was 10 weight percent. The polymer had a Tg, as determined by DSC at 20° C./min, of 42° C. The test results are summarized in Table I.

TABLE I

| EXAMPLE | POLYESTER (wt %) | PLASTICIZER (wt %) | Tg (°C.) | HAZE (%) |
| --- | --- | --- | --- | --- |
| I | 100 | 0 | 77° C. | 0.39 |
| II | 98 | 2 | 67° C. | 0.62 |
| III | 96 | 4 | 61° C. | 0.68 |
| IV | 94 | 6 | 54° C. | 0.65 |
| V | 92 | 8 | 49° C. | — |
| VI | 90 | 10 | 42° C. | — |

The results in Table I clearly show that the glass transition temperature of a heat-shrinkable polyester film can be significantly decreased by melt blending a critical amount of a plasticizer having low volatility at a temperatures of less than 300° C. with the polyester. In addition, the haze values indicate that the film produced by the polyester/plasticizer blends of the present invention are clear since-the percent haze is significantly below 5%.

EXAMPLE VII

PVC sheet was stretched into film at 90° C. with a stretch ratio 3 times in the machine direction (MD) and without any stretch in the transverse direction (TD). In other words, the film was uniaxially oriented. The shrinkage of the oriented film was measured in a constant temperature water bath for 30 seconds. Typical data measured at 60°, 70°, 80°, and 90° C. respectively are illustrated in Table II. The on-set shrink temperature was about 60° C. The maximum shrink rate is the highest first derivative value, slope, of shrinkage vs temperature curve or shrink curve. The test results for PVC shrinkage and maximum shrink rate are summarized in Table II.

EXAMPLE VIII

The PETG polyester prepared in Example I was extruded into sheet then stretched into film at 90° C. with a MD stretch ratio 4 times. The on-set shrink temperature for PETG was about 65° C. The test results for PETG shrinkage, maximum shrink rate and mechanical properties are summarized in Tables II and III.

EXAMPLE IX

The PETG polyester pellets prepared in Example I were melt blended with 2% octyl epoxy soyate and extruded into sheet then stretched into film at 85° C. with a MD stretch ratio 4 times. The test results for shrinkage, maximum shrink rate and mechanical properties are summarized in Tables II and III.

EXAMPLE X

The PETG polyester pellets prepared in Example I were melt blended with 4% octyl epoxy soyate and extruded into sheet then stretched into film at 80° C. with a MD stretch ratio 4 times. The test results for shrinkage, maximum shrink rate and mechanical properties are summarized in Tables II and III.

EXAMPLE XI

The PETG polyester pellets prepared in Example I were melt blended with 6% octyl epoxy soyate and extruded into sheet then stretched into film at 75° C. with a MD stretch ratio 4 times. The test results for shrinkage, maximum shrink rate and mechanical properties are summarized in Tables II and III.

EXAMPLE XII

The PETG polyester pellets prepared in Example I were melt blended with 8% octyl epoxy soyate and extruded into sheet then stretched into film at 70° C. with a MD stretch ratio 4 times. The on-set temperature of the shrink film was so low that the film began shrinking during a warm day.

EXAMPLE XIII

The PETG polyester pellets prepared in Example I were melt blended with 10%octyl epoxy soyate and extruded into sheet then stretched into film at 65° C. with a MD stretch ratio 4 times. The on-set temperature of the shrink film was so low that the film began shrinking during a warm day.

TABLE II

| EXAMPLE | VII | VIII | IX | X | XI |
|---|---|---|---|---|---|
| Stretch Temp, °C. | 90 | 90 | 85 | 80 | 75 |
| Stretch Ratio | 3 | 4 | 4 | 4 | 4 |
| Shrinkage at 60° C., % | 2 | 0 | 2 | 11 | 27 |
| Shrinkage at 70° C., % | 26 | 21 | 29 | 52 | 49 |
| Shrinkage at 80° C., % | 51 | 63 | 66 | 70 | 58 |
| Shrinkage at 90° C., % | 58 | 73 | 75 | 75 | 70 |
| Max. Shrink Rate, %/°C. | 3.90 | 5.22 | 4.28 | 3.90 | 3.75 |
| On Set Shrink Temp. °C. | 60 | 65 | 60 | 55 | 45 |

The results in Table II clearly show that both on-set shrink temperature and maximum shrink rate are reduced by modification with a plasticizer. In addition, the data indicates that PETG is inferior to PVC since PETG has a higher maximum shrink rate and on-set shrink temperature.

The polyester/2% plasticizer blend has 2% shrinkage at 60° C. as compared to 0% for straight PETG. The maximum shrink rate also decreases from 5.22%/°C. of straight PETG to 4.28%/°C. of plasticized PETG with 2% OES. Therefore, the on-set shrink temperature of plasticized PETG with 2% OES is identical to that of PVC even though its maximum shrink rate is still higher than that of PVC.

The polyester/4% plasticizer blend has an on-set shrink temperature of about 55° C. It has 11% shrinkage at 60° C. and the maximum shrink rate of this plasticized PETG is 3.9%/°C. which is identical to that of PVC. In short, the plasticized PETG with 4% OES has the similar shrink rate as compared to PVC. It has lower on-set shrink temperature so that it can be used in even lower temperature shrink packaging. This plasticized version of PETG has even better shrinkage characteristics compared to straight PETG 6763.

The polyester/6% plasticizer blend has an on-set shrink temperature of about 45° C. which is suitable for very heat sensitive shrink packaging. The maximum shrink rate is also reduced to 3.75%/°C.

TABLE III

| EXAMPLE | | VIII | IX | X | XI |
|---|---|---|---|---|---|
| | | Tensile Properties | | | |
| Yield Stress | MD | 151.3 | 111.6 | 82.3 | 60.3 |
| (MPa) | TD | 53 | 36.8 | 36.4 | 36.9 |
| Yield strain | MD | 5.6 | 5.4 | 5.1 | 5.0 |
| (%) | TD | 3.4 | 3.6 | 4.3 | 5.4 |
| Young Mod. | MD | 5530 | 3841 | 2661 | 1793 |
| (MPa) | TD | 1805 | 1280 | 1207 | 1241 |
| Stiffness | MD | 108 | 136 | 84 | 69 |
| (N. mm/cm$^3$) | TD | 250 | 167 | 136 | 102 |
| Break stress | MD | 382.3 | 271.6 | 179.1 | 102.8 |
| (MPa) | TD | 80.4 | 49.6 | 39.3 | 27.9 |
| Break strain | MD | 46.1 | 88.1 | 78.3 | 107.2 |
| (%) | TD | 466.5 | 466 | 435.9 | 351.2 |

MD - machine direction or stretch direction
TD - transverse direction or unoriented direction The data in Table III indicates that the Polyester/plasticizer blends of the present invention produce heat-shrinkable films and sheet which exhibit acceptable mechanical properties.

What is claimed is:

1. A process for preparing a heat-shrinkable film comprising:
   (I) mixing at a temperature of 200° C. to 315° C.
      (A) 90 to 99 weight percent of a polyester having a glass transition temperature of 40° C. to 150° C. and an inherent viscosity of 0.5 to 1.2 dL/g, comprising
         (1) a dicarboxylic acid component comprising repeat units from at least 80 mole percent of an aromatic dicarboxylic acid having 8 to 14 carbon atoms, and
         (2) a diol component-comprising repeat units from at least 10 mole percent of 1,4-cyclohexanedimethanol, based on 100 mole percent dicarboxylic acid and 100 mole percent diol; and
      (B) 1 to 10 weight percent of a plasticizer selected from a $C_4$ to C20 alkyl ester of an epoxidized fatty acid having 12 to 20 carbon atoms provided the plasticizer has sufficient stability to permit its incorporation into the polyester at a temperature of 200° C. to 300° C., wherein the combined weights of (A) and (B) total 100 percent; and
   (II) forming the blend into a film.

2. A process for preparing a heat-shrinkable film comprising:
   (I) mixing at a temperature of 200° C. to 315° C.
      (A) 90 to 99 weight percent of a polyester having a glass transition temperature of 40° C. to 150° C. and an inherent viscosity of 0.5 to 1.2 dL/g, comprising
         (1) a dicarboxylic acid component comprising repeat units from at least 80 mole percent of terephthalic acid, and (2) a diol component comprising repeat units from 65 to 90 mole percent ethylene glycol and 35 to 10 mole percent 1,4-cyclohexanedimethanol, based on 100 mole percent dicarboxylic acid and 100 mole percent diol; and (B) 1 to 10 weight percent of a plasticizer selected from the group consisting of octyl epoxy soyate, epoxy tallates, epoxidized soybean oil, epoxidized linseed oil, triphenyl phosphate, neopentyl glycol dibenzoate, glycerine, vegetable oil, and mineral oil, wherein the combined weights of (A) and (B) total 100 percent; and (II) forming the blend into a film.

* * * * *

UNITED STATES PATENT AND TRADEMARK OFFICE
CERTIFICATE OF CORRECTION

PATENT NO. : 5,589,126

DATED : December 31, 1996

INVENTOR(S) : Wayne K. Shih, et al.

It is certified that error appears in the above-indentified patent and that said Letters Patent is hereby corrected as shown below:

Column 8, line 48 (Claim 1, line 10), "component–comprising" should read --- component comprising ---.

Column 8, line 53 (Claim 1, line 15), "C20" should read --- $C_{20}$ ---.

Signed and Sealed this

Nineteenth Day of August, 1997

*Attest:*

BRUCE LEHMAN

*Attesting Officer*   Commissioner of Patents and Trademarks